US008576818B2

(12) United States Patent
Dahl et al.

(10) Patent No.: US 8,576,818 B2
(45) Date of Patent: Nov. 5, 2013

(54) LOCATION OF MOBILE NETWORK NODES

(75) Inventors: Paul A. Dahl, Pleasant Grove, UT (US); Scott McCall, Provo, UT (US)

(73) Assignee: Digi International Inc., Minnetonka, MN (US)

( * ) Notice: Subject to any disclaimer, the term of this patent is extended or adjusted under 35 U.S.C. 154(b) by 319 days.

(21) Appl. No.: 12/853,714

(22) Filed: Aug. 10, 2010

(65) Prior Publication Data
US 2012/0039310 A1 Feb. 16, 2012

(51) Int. Cl.
*H04Q 7/24* (2006.01)
(52) U.S. Cl.
USPC .......................................................... 370/338
(58) Field of Classification Search
None
See application file for complete search history.

(56) References Cited

U.S. PATENT DOCUMENTS

| | | | |
|---|---|---|---|
| 5,918,024 A * | 6/1999 | Moon | 710/106 |
| 7,026,992 B1 | 4/2006 | Hunt et al. | |
| RE40,346 E * | 5/2008 | Moon | 710/106 |
| 2003/0099202 A1 * | 5/2003 | Lear et al. | 370/238 |
| 2005/0002481 A1 | 1/2005 | Woo et al. | |
| 2006/0267841 A1 | 11/2006 | Lee et al. | |
| 2008/0153509 A1 | 6/2008 | Piekarski | |
| 2008/0222320 A1 * | 9/2008 | Suganuma | 710/35 |
| 2008/0242313 A1 * | 10/2008 | Lee et al. | 455/456.1 |
| 2009/0325566 A1 * | 12/2009 | Bell et al. | 455/419 |
| 2010/0164720 A1 * | 7/2010 | Kore | 340/541 |
| 2011/0170477 A1 * | 7/2011 | Cao et al. | 370/328 |
| 2011/0202466 A1 * | 8/2011 | Carter | 705/67 |
| 2012/0016626 A1 * | 1/2012 | Laine et al. | 702/150 |

OTHER PUBLICATIONS

"International Application Serial No. PCT/US2011/047240, International Search Report mailed Nov. 7, 2011", 3 pgs.
"International Application Serial No. PCT/US2011/047240, Written Opinion mailed Nov. 7, 2011", 9 pgs.
"International Application Serial No. PCT/US2011/047240, Preliminary Report on Patentability mailed Nov. 8, 2012", 14 pgs.
"International Application Serial No. PCT/US2011/047240, Written Opinion mailed Jul. 30, 2012", 7 pgs.

* cited by examiner

*Primary Examiner* — Hassan Phillips
*Assistant Examiner* — Prenell Jones
(74) *Attorney, Agent, or Firm* — Fogg & Powers LLC

(57) ABSTRACT

The physical position of an unknown node in a network is determined by sending a first sent WiFi signal from one of an unknown node and a first reference node having a known location, and repeating the sent WiFi signal in the other of the unknown node and first reference node with a first reply WiFi signal. A distance is derived between the unknown node and the first reference node from the time of flight of the first sent and first reply WiFi signals. A second WiFi signal is sent from one of the unknown node and a second fixed node having a known location, and repeating the sent second WiFi signal in the other of the unknown node and second reference node with a second reply WiFi signal, and A distance is derived between the unknown node and the second reference node from the time of flight of the second sent and second reply WiFi signals. A physical location of the unknown node is determined based on the derived distances between the unknown node and the first and second reference nodes.

10 Claims, 2 Drawing Sheets

$$301 \quad d = v \cdot t$$

$$302 \quad d = \frac{v \cdot t_1 + v \cdot t_2 - V\, t_{turn}}{2}$$

$$303 \quad d = \frac{v \cdot t_{total} - v \cdot t_{turn}}{2} = v \cdot \left(\frac{t_{total}}{2} - t_{turn}\right)$$

$$304 \quad d = \frac{v \cdot t_{total}}{2}$$

LOCATION OF MOBILE NETWORK NODES

FIELD OF THE INVENTION

The invention relates generally to wireless networks, and more specifically in one embodiment to locating mobile wireless mesh network nodes.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

Mesh networks are often made up of network nodes that are not mobile, and so link quality and reliability is relatively slow to change. Most applications of mesh networks rely on radio frequency communications to transfer data between network nodes, as running cables between nodes defeats somewhat the intended ease of installation and use of mesh network devices.

Mesh network device installations often have multiple networks deployed in remote locations, and are managed from a central location or server. The central location computer might have knowledge of what devices are within each of the mesh networks under management, but typically does not have direct access to the network nodes or knowledge of the location of each node in the network. For example, a mesh network controller might monitor an array of network nodes attached to various tools or production equipment in a facility and know the location of some fixed nodes in the facility, but will not know the location of other, mobile nodes in the network.

There exists a need to provide network technology that addresses factors such as management of wireless network nodes.

SUMMARY

One example embodiment of the invention comprises determining the physical position of a movable node in a wireless network by sending a first sent WiFi signal from one of an unknown node and a first reference node having a known location, and repeating the sent WiFi signal in the other of the unknown node and first reference node with a first reply WiFi signal. A distance is derived between the unknown node and the first reference node from the time of flight of the first sent and first reply WiFi signals. A second WiFi signal is sent from one of the unknown node and a second fixed node having a known location, and repeating the sent second WiFi signal in the other of the unknown node and second reference node with a second reply WiFi signal, and A distance is derived between the unknown node and the second reference node from the time of flight of the second sent and second reply WiFi signals. A physical location of the unknown node is determined based on the derived distances between the unknown node and the first and second reference nodes.

DETAILED DESCRIPTION

Figure 1:
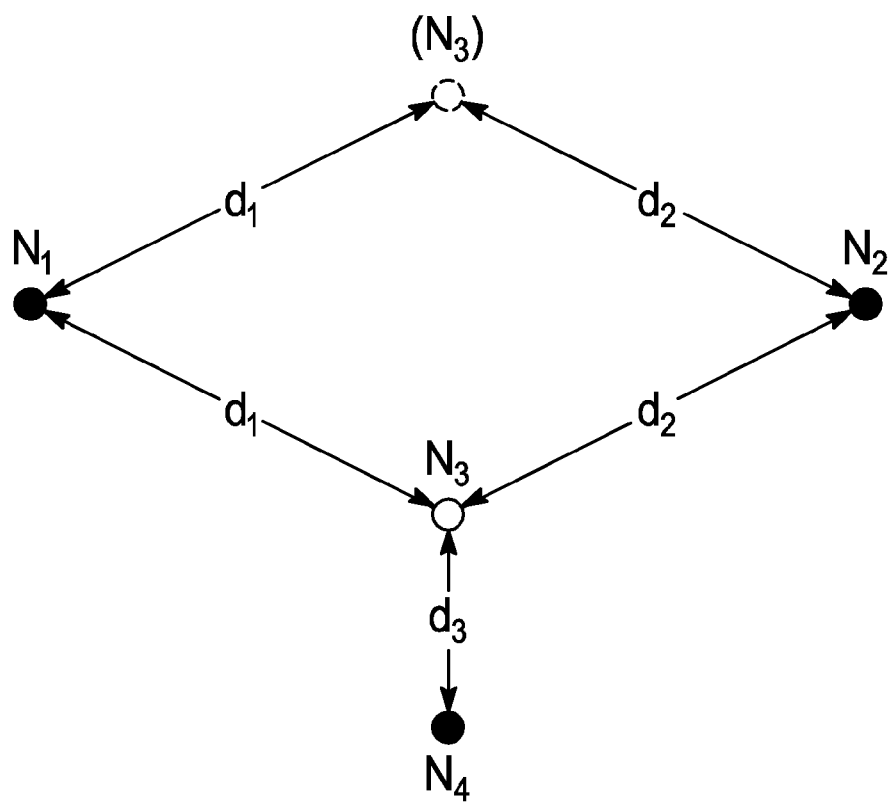
FIG. 1 shows a wireless network, as may be used to practice some embodiments of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Many wireless networks such as mesh networks are often used to route data between various elements or nodes in a network made up of a number of loosely assembled nodes. Mesh networks are designed such that a compatible node can easily join the network and receive and send data, including passing received data long a route to an intended destination node. Mesh networks are therefore considered self-arranging and self-healing, in that if a node becomes inoperable or loses a connection to another node, data can be easily routed around the broken network link.

Many mesh network technologies use wireless communication, further enhancing the ease of use of mesh networking for certain applications. Because deployed mesh network nodes are typically stationary for some period of time, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network or other type of network.

One example of a mesh network standard using wireless radio communication is the ZigBee mesh network, which was developed by an industry alliance and is related to IEEE standards including 802.15.4. Other wireless networks include 802.11 standards such as a, b, g, and n, more commonly known as WiFi, used for wireless computer networks. Distance between nodes is often estimated using relative signal strengths of signals from multiple nodes having known locations to estimate the position of the unknown node, using the radio modems in a WiFi, ZigBee, or DigiMesh network.

But, signals can be attenuated or amplified by presence of metal objects in the area, such as in a warehouse environment, making such position determination using signal strength suspect. Because mesh networks are often used in monitoring or tracking applications where the physical location of a node is important, it is often desirable to be able to determine the physical position of a new or mobile node in such a wireless network environment.

Some solutions to network node position determination include using GPS (Global Positioning System) receivers in the nodes, such that the GPS receiver can provide the node with its location. This significantly raises the cost and complexity of the node, as a GPS receiver must then be added to each such node, and the node must be able to receive strong enough GPS signals to make a position determination. Other systems use a common timebase and methods of triangulation or trilateration, but require a significant number of messages be passed from the mobile node to determine time of flight to at least three other nodes with known positions.

The ability to find high value assets is an expensive undertaking in many environments, such as within an engineering facility or hospital where a large amount of movable expensive equipment is distributed throughout a large facility. Determination of asset location is often an expensive and time-consuming task, involving activities such as regular barcode scanning of every asset in a facility or purchase of more assets than are needed to ensure that they can be located when needed.

One example embodiment of the invention therefore provides a solution for location of wireless network nodes, such as wireless asset identification nodes attached to mobile assets, in a wireless network environment. A WiFi radio operable on multiple bands, such as an 802.11 a/b/g WiFi radio or a a/g/n WiFi radio, is in a further example operated as a repeater having substantially no turnaround time or a low fixed turnaround time, such that it is operable to receive a signal on a first frequency or channel and immediately resend a signal on another frequency or channel. This would traditionally not be possible without use of multiple radios and data processing, resulting in a relatively complex and expensive system. Widespread adoption of WiFi integrated circuits have made repeating a received signal on another channel relatively practical and inexpensive, enabling more practical implementation of many embodiments described herein.

Using one WiFi channel or frequency to receive a signal and another frequency or channel to re-send the signal back to the originating node, time of flight can be calculated and used to compute the distance between a first node and the repeater node, enabling ranging between nodes and determination of the position of an unknown node using multiple nodes of known location.

FIG. 1 shows an example wireless network, as may be used to practice an example embodiment of the invention. Fixed nodes N1 and N2 have known locations, and a third node N3 has an unknown location. The unknown node N3 initiates a location process, such as to report its physical position to another node on the network for asset tracking.

Unknown node N3 sends a message to node N1 on a first channel or band, such as an 802.11a, b, or g WiFi channel, or the 2.4 GHz or 5 GHz wireless bands for 802.11(n). Node N1's wireless radio is operable to receive on one channel or frequency and to transmit on another channel or frequency simultaneously, and so is said to be capable of duplex operation. Node N1 receives the incoming signal, and nearly instantaneously resends the received signal or another suitable responsive signal back to unknown node N3 using the other channel or frequency. Because the turnaround time is small compared to the propagation time the signals take to travel between nodes N3 and N1, node N3 can compute the distance to node N1 based on the time taken to receive a reply signal without having to compensate for a turnaround time in node N1, denoted as D1 in FIG. 1.

Node N3 repeats this distance-finding method with fixed node N2 and calculates the distance D2 separating nodes N3 and N2. Node N3 has therefore determined its distance to two nodes having fixed, known locations, and in some embodiments may have sufficient information to locate the unknown node N3.

In a three-dimensional space, this narrows the position of unknown node N3 down to points along a circle having its center along the line connecting nodes N1 and N2, such that the distance D1 is maintained between nodes N3 and N1 and distance D2 is maintained between node N3 and N2. In a multi-story building where the unknown node could be at several locations along this circle, further location information is desired to more accurately pinpoint the location of the unknown node N3. But, if the nodes are all in a single plane, such as in a single-floor factory facility, the location of node N3 can be determined to be at one of two locations denoted by N3 and (N3) in FIG. 1. Selection of nodes N1 and N2 such that they are at one end of the possible location space, such as along a wall of the factory or facility, enables the node N3 to conclude that it is likely on a known side of the wall and therefore at location N3 rather than (N3).

When the unknown node is located in a three-dimensional space, or when it cannot be easily determined which of two possible locations N3 and (N3) the unknown node N3 is actually located, a third known node N4 is used as shown in FIG. 1. This additional distance information d3 can be used to ensure that the node is at location N3 rather than at location (N3) within the plane of a factory floor or other relatively flat physical node space. It can also be used to determine the location of unknown node N3 in three dimensions, where it is known which side of the plane formed by N1, N2, and N4 the unknown node N3 will be found. This enables three dimensional location of node N3 such as where the unknown nodes are all on the ground floor of a multi-level facility, or all on the roof of the facility so that the unknown node will be in a known direction from the plane formed by the three known nodes.

Figure 2:
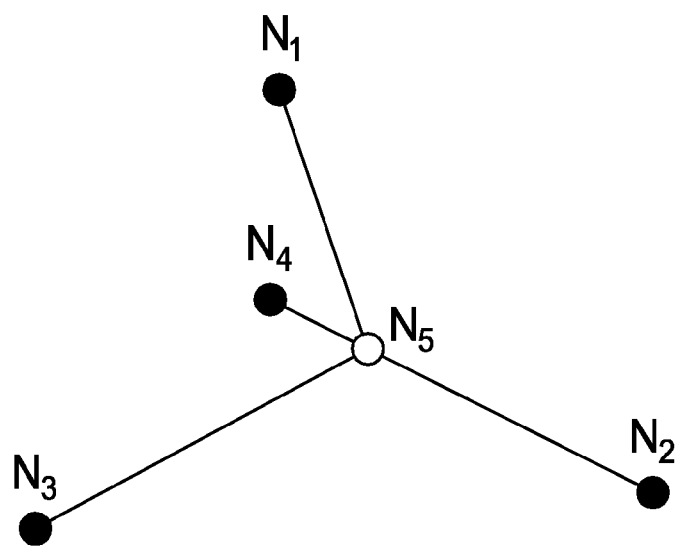
FIG. 2 shows a wireless network, as may be used to practice some embodiments of the invention.

When three dimensional location is desired and the unknown node may be located anywhere with respect to the known nodes, a fourth known node is used as is shown in FIG. 2. Although it is desirable to have the nodes relatively uniformly distributed in three dimensions for greatest accuracy, any configuration in which nodes N1-N4 are not all in the same plane will be suitable in this example. An unknown node N5 can then determine its distance to each of the four nodes N1-N4, finding its location within three dimensions.

Although the turnaround time in the nodes is considered trivial in the above example, factors such as turnaround time and time taken to initiate transmission or reception may be large enough in some embodiments to result in a slight inaccuracy in the distances determined between nodes. Because these processing times will be similar for all fixed nodes in the system, the location of the unknown node can be determined with greater accuracy by simply subtracting an estimated turnaround time from the distances calculated, or by subtracting the same distances from d1, d2, and d3, until the best convergence of the three distances is obtained.

Figures 3, 4:
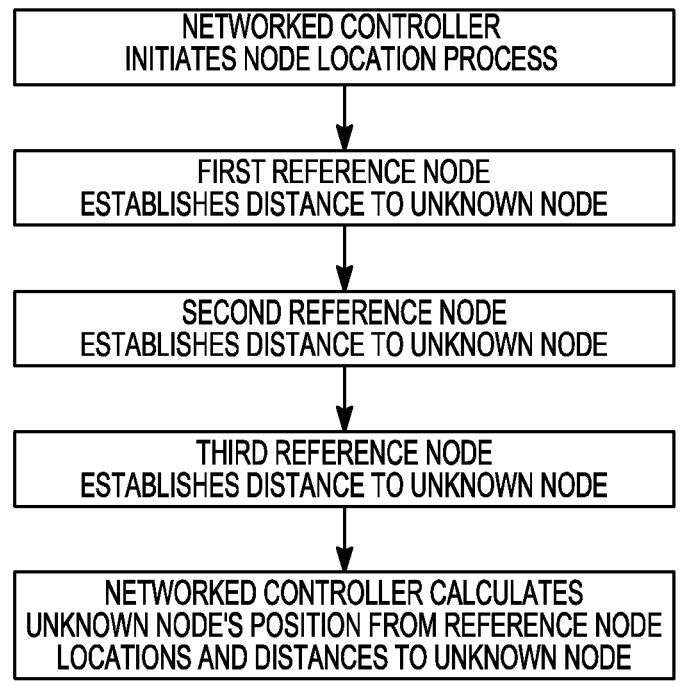
FIG. 3 shows a variety of equations as may be used to practice some embodiments of the invention.
FIG. 4 shows a flowchart of determining an unknown node's physical position using repeater nodes, consistent with an example embodiment of the invention.

FIG. 3 shows various equations illustrating determination of distance based on propagation time for various embodiments of the invention. The basic principle is illustrated at 301, which illustrates that distance covered by a radio signal is equal to velocity multiplied by time of travel. Because the velocity of radio waves is a known constant, and the time of travel is measured by the known or unknown nodes, the distance between the nodes can be calculated.

More specifically, the distance between two nodes as shown at 302 is the propagation velocity multiplied by the time taken to travel one way plus the propagation velocity multiplied by the time taken to travel back, minus the propagation velocity times the time taken to turn around. This can be simplified as shown at 303 to the velocity times the total time of flight divided by two, minus any turnaround time or other delay or processing time. In example such as that of FIG. 1 where the turnaround time is not significant relative to the propagation time, the turnaround time is dropped, and the distance is reflected by equation 304 which shows the distance between two nodes and the product of the velocity of propagation multiplied by the total time of flight, divided by two.

Turnaround time is in some embodiments designed to be a fraction of the anticipated time of flight of the sent and reply signals, such as $1/10$, $1/20$, $1/50$, $1/100$, $1/500$, $1/1000$, or some other such fraction of the time of flight.

Although these examples have illustrated how the unknown node N3 can seek to determine its position by initiating communication with two or more neighboring nodes having known locations, a network device can also instruct the fixed nodes to initiate communication with the unknown node to determine its location, such as to locate a piece of equipment having a duplex radio but little additional processing power or capability. FIG. 4 is a flowchart illustrating an example method of finding such an unknown node.

At 401, a networked computerized system initiates a node location process, attempting to physically locate a node having an unknown location such as N3 of FIG. 1. The location of three reference nodes N1, N2, and N4 are known, and this knowledge is used along with derived distance information to determine the location of the unknown node. The first reference node N1 sends a message to the unknown node, which sends a reply message on another channel or frequency to the node N1 as soon as the incoming message is received.

The time of flight is then used to derive the distance between reference node N1 and unknown N3 at 402, such as by using the methods described in conjunction with FIGS. 1-3. Similarly, the distance between reference node N2 and the unknown node N3 is determined at 403, and the distance between reference node N4 and unknown node N3 is determined at 404.

This information is used to determine the location of the unknown node N3 at 405, by finding the two points in space at which the unknown node's distance to the three reference nodes matches the distances determined in steps 402-404. In alternate embodiments, a greater or fewer number of reference node distances may be derived to locate the unknown node, depending on the spatial configuration of the known and unknown nodes.

These examples have illustrated how a radio operable to receive and send on different channels or frequencies, including use of different WiFi 802.11 standards and different bands, can be used to provide very fast turnaround of a received signal when operating in a duplex mode. In a more detailed example, a repeater forwards messages received on one channel to be immediately transmitted on another channel with no processing, effectively making turnaround time insignificant relative to time of flight. This enables relatively easy calculation of the distance between two nodes based on time of flight, at relatively low cost using standard radios such as WiFi band radios, allowing the network to derive the position of an unknown node through its known distances to reference nodes of known position.

The approach described herein has a variety of advantages over systems currently in use, such as not needing complicated and expensive Global Positioning System hardware or carefully synchronized clocks distributed between nodes. Although the example above is presented in the context of a WiFi network, other wireless networks such as Zigbee or DigiMesh and wireless cellular networks can also use methods such as those described herein to determine the position of a mobile node in the network using two or more other nodes having known locations.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of determining the physical position of a movable node in a network, comprising:
    sending a first sent WiFi signal from one of an unknown node and a first reference node having a known location, and repeating the sent WiFi signal in the other of the unknown node and first reference node with a first reply WiFi signal;
    deriving a distance between the unknown node and the first reference node from the time of flight of the first sent and first reply WiFi signals;
    sending a second sent WiFi signal from one of the unknown node and a second fixed node having a known location, and repeating the sent second WiFi signal in the other of the unknown node and second reference node with a second reply WiFi signal;
    deriving a distance between the unknown node and the second reference node from the time of flight of the second sent and second reply WiFi signals; and
    determining a physical location of the unknown node based on the derived distances between the unknown node and the first and second reference nodes;
    wherein repeating at least one of the first and second sent WiFi signals comprises repeating the respective sent WiFi signal with the respective first or second reply WiFi signal on a different frequency or channel than the respective sent WiFi signal without processing the respective sent WiFi signal.

2. The method of determining the physical position of a movable node in a network of claim 1, further comprising:
    sending a third sent WiFi signal from one of the unknown node and a third fixed node having a known location, and repeating the third sent WiFi signal in the other of the unknown node and third reference node with a third reply WiFi signal; and
    deriving a distance between the unknown node and the third reference node from the time of flight of the third sent and third reply WiFi signals;

wherein determining a physical location of the unknown node is further based on the derived distance between the unknown node and the third reference node.

3. The method of determining the physical position of a movable node in a network of claim 2, further comprising:
sending a fourth sent WiFi signal from one of the unknown node and a fourth fixed node having a known location, and repeating the fourth sent WiFi signal in the other of the unknown node and fourth reference node with a fourth reply WiFi signal; and
deriving a distance between the unknown node and the fourth reference node from the time of flight of the fourth sent and fourth reply WiFi signals;
wherein determining a physical location of the unknown node is further based on the derived distance between the unknown node and the fourth reference node.

4. The method of determining the physical position of a movable node in a network of claim 1, further comprising compensating for at least one of turnaround time and poor convergence of the derived distances in determining the physical location of the unknown node.

5. The method of determining the physical position of a movable node in a network of claim 1, wherein at least one of the sent and reply WiFi signals comprise 802.11 a, b, g, or n standard WiFi standard signals.

6. A wireless network, comprising:
an unknown node having an unknown physical position;
a first reference node, wherein one of the unknown node and the first reference node is operable to send a first sent signal, and the other of the unknown node and first reference node is operable to repeat the first sent signal by sending a first reply signal; and
a second reference node, wherein one of the unknown node and the second reference node is operable to send a second sent signal, and the other of the unknown node and second reference node is operable to repeat the second sent signal by sending a second reply signal;
at least one node in the wireless network further operable to derive a distance between the unknown node and the first reference node from the time of flight of the first sent and first reply signals, derive a distance between the unknown node and the second reference node from the time of flight of the second sent and second reply signals, and determine a physical location of the unknown node based on the derived distances between the unknown node and the first and second reference nodes;
wherein repeating at least one of the first and second sent signals comprises repeating the respective sent signal with the respective first or second reply signal on a different frequency or channel than the respective sent signal without processing the respective sent signal.

7. The wireless network of claim 6, further comprising:
a third reference node, wherein one of the unknown node and the third reference node is operable to send a third sent signal, and the other of the unknown node and third reference node is operable to repeat the third sent signal by sending a third reply signal;
at least one node in the wireless network further operable to derive a distance between the unknown node and the third reference node from the time of flight of the third sent and third reply signals, and determine a physical location of the unknown node based on the derived distance between the unknown node and the third reference node.

8. The wireless network of claim 7, further comprising:
a fourth reference node, wherein one of the unknown node and the fourth reference node is operable to send a fourth sent signal, and the other of the unknown node and fourth reference node is operable to repeat the fourth sent signal by sending a fourth reply signal;
at least one node in the wireless network further operable to derive a distance between the unknown node and the fourth reference node from the time of flight of the fourth sent and fourth reply signals, and determine a physical location of the unknown node based on the derived distance between the unknown node and the fourth reference node.

9. The wireless network of claim 6, wherein determining a physical location of the unknown node based on the derived distances comprises compensating for at least one of turnaround time and poor convergence of the derived distances in determining the physical location of the unknown node.

10. The wireless network of claim 6, wherein at least one of the sent and reply signals comprise 802.11 standard WiFi standard signals.

* * * * *